United States Patent [19]

Pickl et al.

[11] Patent Number: 5,039,474
[45] Date of Patent: Aug. 13, 1991

[54] APPARATUS FOR THE ORDERED, COMPLETE FILLING OF A CONTAINER WITH RODS, PARTICULARLY RODS OF SPENT FUEL ASSEMBLIES FROM NUCLEAR FACILITIES, IN A HEXAGONALLY CLOSE-PACKED STRUCTURE

[75] Inventors: Egon Pickl, Grosshabersdorf; Joachim Krueger, Forchheim, both of Fed. Rep. of Germany

[73] Assignee: Siemens Aktiengesellschaft, Munich, Fed. Rep. of Germany

[21] Appl. No.: 380,800

[22] Filed: Jul. 14, 1989

[30] Foreign Application Priority Data

Jul. 22, 1988 [DE] Fed. Rep. of Germany ....... 8809387

[51] Int. Cl.$^5$ ............................................. G21C 19/00
[52] U.S. Cl. .................................... 376/261; 376/272; 53/236
[58] Field of Search ................... 376/261, 272; 53/149, 53/236, 244, 246; 414/146; 29/723, 906, 468; 206/443

[56] References Cited

U.S. PATENT DOCUMENTS

| | | | |
|---|---|---|---|
| 3,930,940 | 1/1976 | Cayol | 376/436 |
| 4,474,727 | 10/1984 | Kmonk et al. | 376/272 |
| 4,526,746 | 7/1985 | Fredin | 376/444 |
| 4,636,351 | 1/1987 | Rohr | 376/272 |
| 4,659,535 | 4/1987 | Couture et al. | 376/261 |
| 4,683,110 | 7/1987 | Baudro et al. | 376/261 |
| 4,842,809 | 6/1989 | Attix et al. | 376/261 |
| 4,856,990 | 8/1989 | DeSantis | 206/443 |

FOREIGN PATENT DOCUMENTS 0005623 11/1979 European Pat. Off. .
0128236 12/1984 European Pat. Off. .
2556489 6/1985 France .

Primary Examiner—Daniel D. Wasil
Attorney, Agent, or Firm—Herbert L. Lerner; Laurence A. Greenberg

[57] ABSTRACT

A filling apparatus for the ordered, complete filling of a container with rods, such as spent nuclear fuel rods, in a hexagonally close-packed structure, includes a device for orderly positioning a first row of rods at predetermined positions in a container which has an opening formed in a side thereof opposite the positioning means and an interior with a given width. Two slides disposed one above the other can reach through the opening over the entire given width of the interior of the container. Each of the slides has depressions formed therein defining support teeth. The depressions define openings at predetermined positions for receiving rods of a row. The depressions in one of the slides is offset relative to the depressions in the other of the slides so that the support teeth in one of the slides covers the openings in the other of the slides when the slides are superimposed. The support teeth of one of the slides braces the rods of a row disposed in the predetermined positions of the other of the slides after the introduction of a row of rods. The predetermined positions of the one slide are uncovered for the introduction of a further row of rods into the predetermined positions of the one slide by retraction of the other slide. The positioning means can be in the form of a further slide for reaching through another opening in the container.

3 Claims, 4 Drawing Sheets

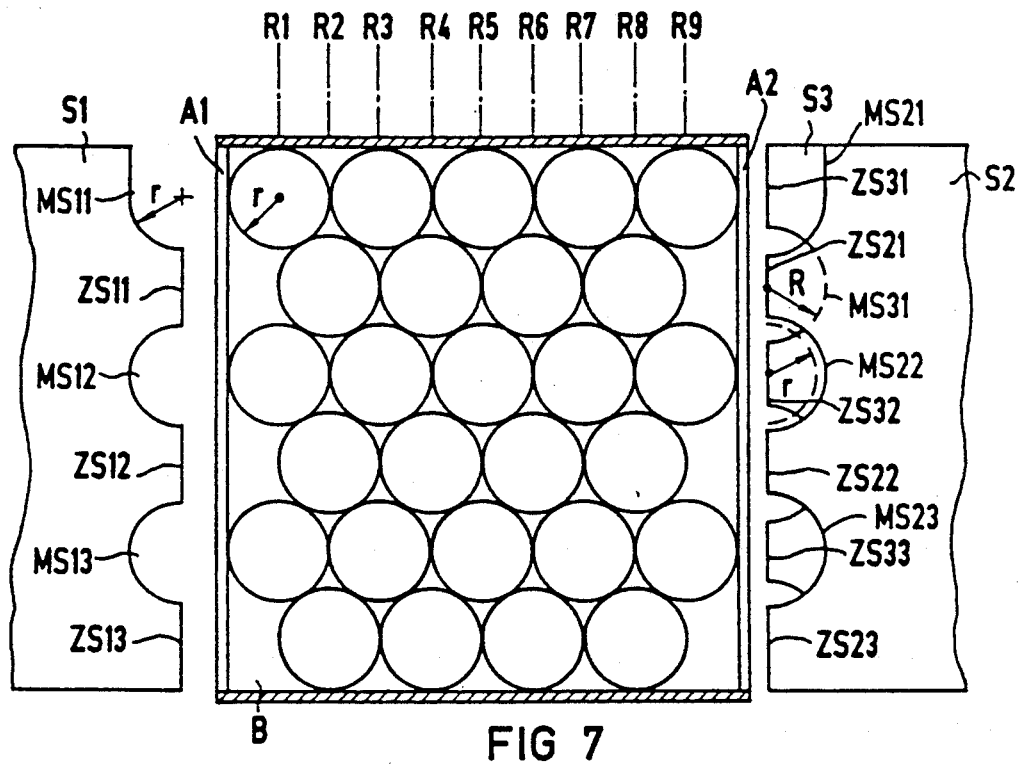
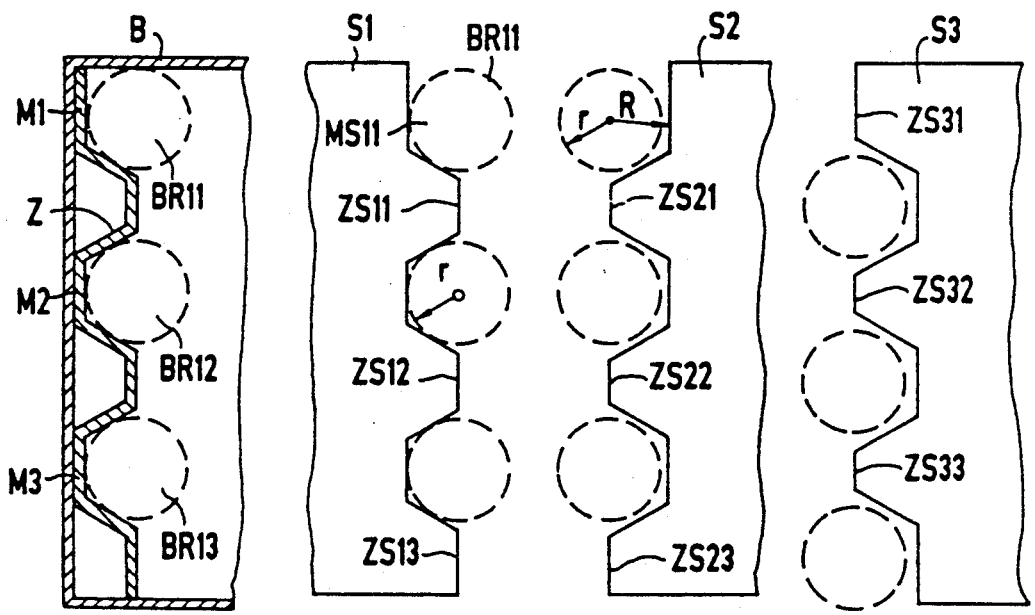
FIG 7
FIG 8  FIG 9a  FIG 9b  FIG 9c

APPARATUS FOR THE ORDERED, COMPLETE FILLING OF A CONTAINER WITH RODS, PARTICULARLY RODS OF SPENT FUEL ASSEMBLIES FROM NUCLEAR FACILITIES, IN A HEXAGONALLY CLOSE-PACKED STRUCTURE

The invention relates to an apparatus for the ordered, complete filling of a container with rods, particularly rods of spent fuel assemblies from nuclear facilities, in a close-packed or in the closest possibly packed hexagonal structure.

Especially in nuclear facilities, it is often necessary to place the individual fuel rods of spent fuel assemblies in containers in an ordered manner, particularly for storage and transport. In order to attain a close-packed hexagonal structure of the rods in the container, it is necessary to place them at predetermined positions in the filling operation, and to secure the rods filling the container against slippage until the container has been completely filled. Especially with remote-controlled handling of rods removed from spent fuel assemblies, which may have a considerable length compared to their diameter, the position intended for the individual fuel rod within the hexagonal packing structure must be specified in a defined manner. Furthermore, the rods must be locked in this position until complete filling of the container has been attained, and because of the complete filling of the interior of the container the rods, which are in a close-packed hexagonal structure, are braced against the container walls and against each other. In contrast, if the predetermined positions inside the close-packed hexagonal structure are not adhered to exactly as the rods are successively introduced into the container, then there is the danger that it may not be possible to fill the container completely, since there would no longer be enough room for the last few rods to be introduced between the rods that are already in place and the inner wall of the container. In such a case, it may be necessary to take all of the rods back out of the container and to start the filling operation all over again.

It is accordingly an object of the invention to provide an apparatus for the ordered, complete filing of a container with rods, particularly rods of spent fuel assemblies from nuclear facilities, in a close-packed hexagonal structure, which overcomes the hereinafore-mentioned disadvantages of the heretofore-known devices of this general type.

With the foregoing and other objects in view there is provided, in accordance with the invention, a filling apparatus for the ordered, complete filling of a container with rods, such as spent fuel rods, in a close-packed hexagonal structure, comprising a means for orderly positioning a first row of rods at predetermined positions in a container having an opening formed in a side thereof opposite the positioning means and an interior with a given width; two mutually facing slides for reaching through the opening over the entire given width of the interior of the container; each of the slides having depressions formed therein defining support teeth between the depressions, the depressions defining openings at predetermined positions for receiving rods of a row, the depressions in one of the slides being offset relative to the depressions in the other of the slides, and the support teeth in one of the slides covering the openings in the other of the slides when the slides are superimposed; and the support teeth of one of the slides bracing the rods of a row disposed in the predetermined positions of the other of the slides after the introduction of a row of rods, and the predetermined positions of the one slide being uncovered for the introduction of a further row of rods into the predetermined positions of the one slide by retraction of the other slide.

In accordance with another feature of the invention, the positioning means are in the form of a further slide for reaching through another opening over the entire given width of the interior of the container, the further slide having depressions formed therein defining openings at predetermined positions for receiving rods of a first row.

In accordance with a concomitant feature of the invention, the positioning means are in the form of a corrugated metal sheet having depressions formed therein defining openings at predetermined positions for receiving rods of a first row in a close-packed hexagonal structure.

Other features which are considered as characteristic for the invention are set forth in the appended claims.

Although the invention is illustrated and described herein as embodied in an apparatus for the ordered, complete filing of a container with rods, particularly rods of spent fuel assemblies from nuclear facilities, in a close-packed hexagonal structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 7 is a cross-sectional view of the filling apparatus with a complete filling with rods in the close-packed hexagonal structure;

FIG. 8 is a fragmentary cross-sectional view of an embodiment of positioning means of the filling apparatus for a first row of rods; and FIGS. 9a, 9b and 9c are fragmentary cross-sectional views of another embodiment of the positioning means as well as embodiments of slides of the filling apparatus.

Figure 1:
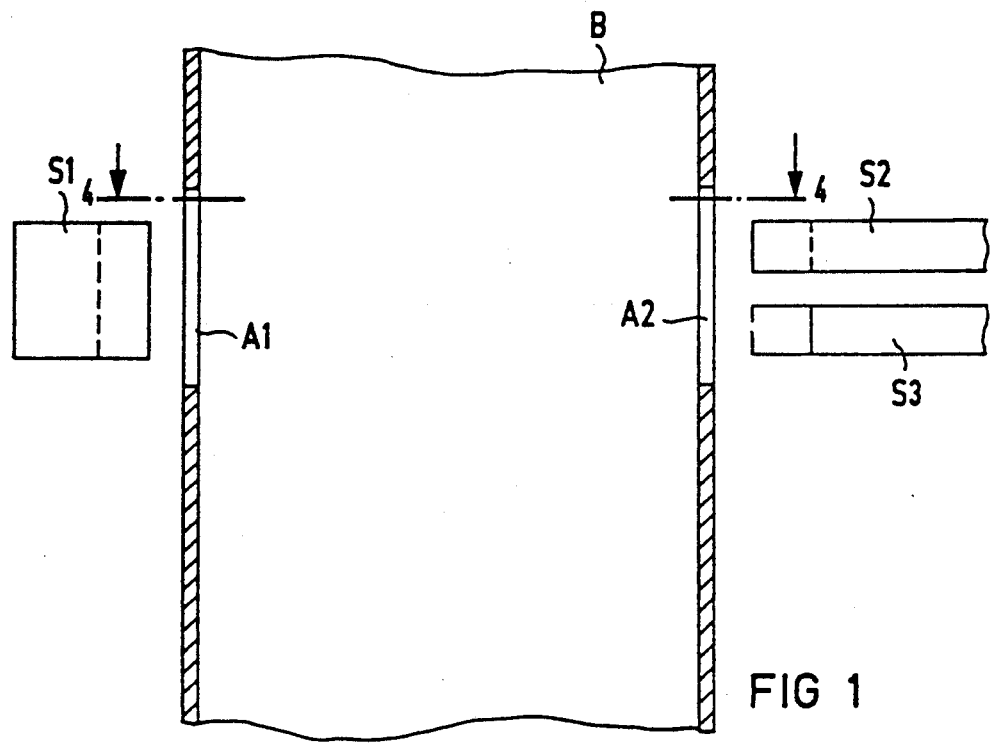
FIG. 1 is a fragmentary, diagrammatic, longitudinal-sectional view of a filling apparatus according to the invention.

Referring now to the figures of the drawing in detail and first, particularly, to FIG. 1 thereof, there is seen an advantageous embodiment of a filling apparatus according to the invention, which is formed of a container B and three slides or pushers S1, S2 and S3. The slides can engage the interior of the container through openings A1 and A2 located opposite one another in the container walls. The slides S2 and S3 which are superimposed one upon another together engage the interior over the entire container width from one side through the opening A2.

Figure 3:
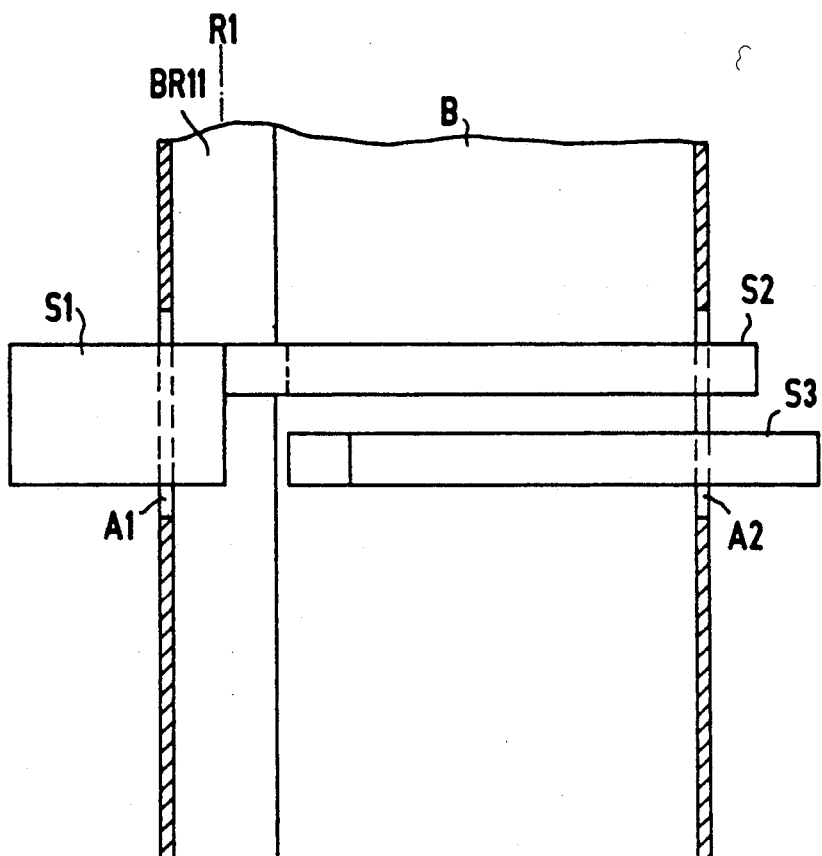
FIG. 3 is a fragmentary longitudinal-sectional view of the filling apparatus when a first roll of rods is introduced.

In FIG. 3, the engagement of the slides is shown upon the insertion of a first rod BR11 of a first row R1 of rods into the container B. The slide S1 serves to position the first row of rods at predetermined positions on the inside of the container wall, at which the filling operation is begun. Depending on the particular inside dimensions of a container, the location of these positions and slip-free adherence to them are crucial, in order to enable complete filling of the container with rods ordered in a close-packed hexagonal structure. During the filling of the first row R1 of rods, the slide S2 is in a so-called filling position, and at first the slide S3 is in a waiting position. The structure of the slides and their mode of operation will be explained in detail below in conjunction with FIGS. 4-7, while describing an example of a filling operation.

Figure 4:
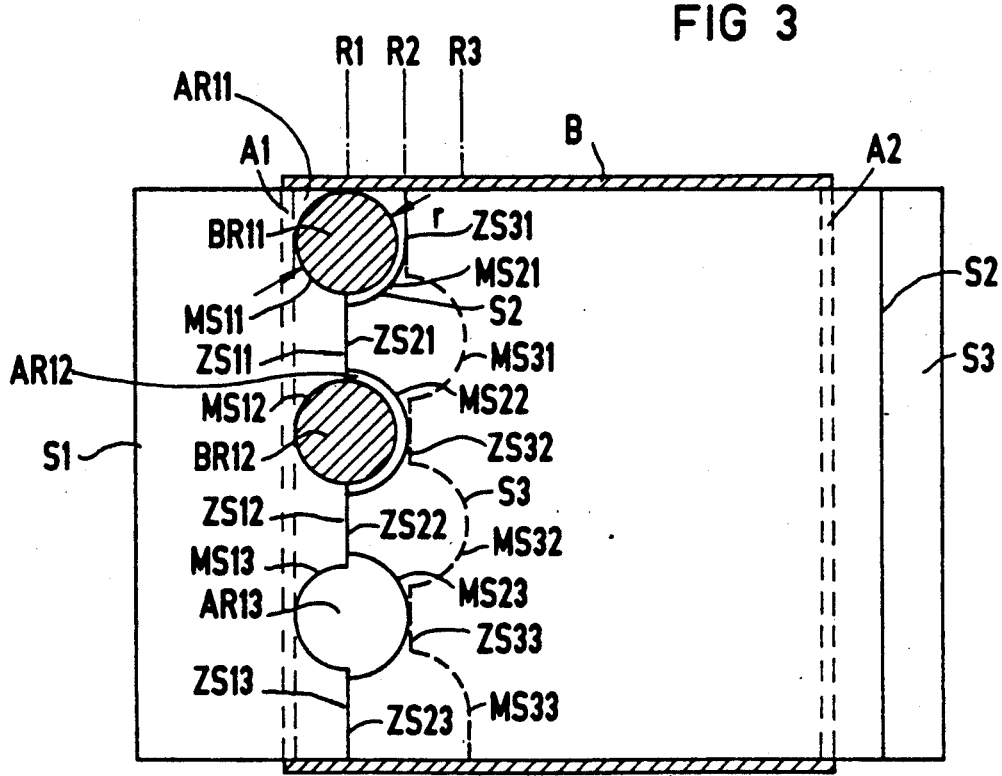
FIG. 4 is a cross-sectional view of the filling apparatus, taken along the line A—A in FIG. 1, in the direction of the arrows, during the operation of introducing a first row of rods.

FIG. 4 is a cross section through the filling apparatus, with the individual slides located in accordance with FIG. 3 in the positions necessary for filling a first row R1 of rods in the container. It can be seen that the slides are provided with depressions on the end surfaces thereof which protrude into the interior of the container. As a result, the positions of the rods of the particular row to be filled in the interior of the container are specified in a defined fashion. In the exemplary embodiment shown in FIG. 4, the rods have a circular cross section. Correspondingly, the depressions in the slides are advantageously constructed as semicircular recesses. Thus the slide S1 in the exemplary embodiment shown in FIG. 4 has depressions MS11, MS12 and MS13 formed therein. Ribs ZS11, ZS12 and ZS13 remaining between the depressions on the end surface of the slide can also be referred to as support teeth. Similarly, the slide S2 has depressions MS21, MS22 and MS23 with support teeth ZS21, ZS22, ZS23 therebetween, and the slide S3 has depressions MS31, MS32, MS33 with intervening support teeth ZS31, ZS32, ZS33.

The depressions and support teeth of the slides S1 and S2 are disposed in such a way that the individual depressions and support teeth are located directly facing one another. In FIG. 4, the support tooth ZS11, for instance, and the depression MS12 of the slide S1 meets the support tooth ZS21 or the depression MS22 of the slide S2. In contrast, the depressions and support teeth of the slides S2 and S3 are offset from one another. If these slides are located directly on top of one another, as shown for instance in FIG. 7, then the support teeth of one slide cover openings of the other which are formed by the depressions and intended for inserting the rods. For instance, in FIG. 7, the support tooth ZS31 of the slide S3 covers the depression MS21 of the slide S2, and the support tooth ZS21 of the slide S2 covers the depression MS31 of the slide S3.

As already explained above, in FIG. 4 the slide S2 is in a filling position and the slide S3 is in a waiting position for filling a first row R1 of rods. The support teeth on the end surface of the slide S2 rest directly on the corresponding support teeth of the slide S1. Openings are formed by the thus opposed depressions of the two slides. These openings enable a precisely positioned introduction of the rods of the first row of rods into the interior of the container to take place at predetermined locations. The depression MS11 of the slide S1, together with the depression MS21 of the slide S2, thus form an opening AR11 at a predetermined position, into which the first rod BR11 has already been introduced in the example of FIG. 4. Correspondingly, the depressions MS13 and MS23 of the slides S1 and S2 form an opening AR13 at a predetermined position. In order to enable the introduction of rods into the openings thus formed, the slide S3 is retracted far enough into the waiting position that its support teeth ZS31, ZS32, ZS33 uncover the depressions MS21, MS22, MS23 to form the openings AR11, AR12, AR13.

Figure 5:
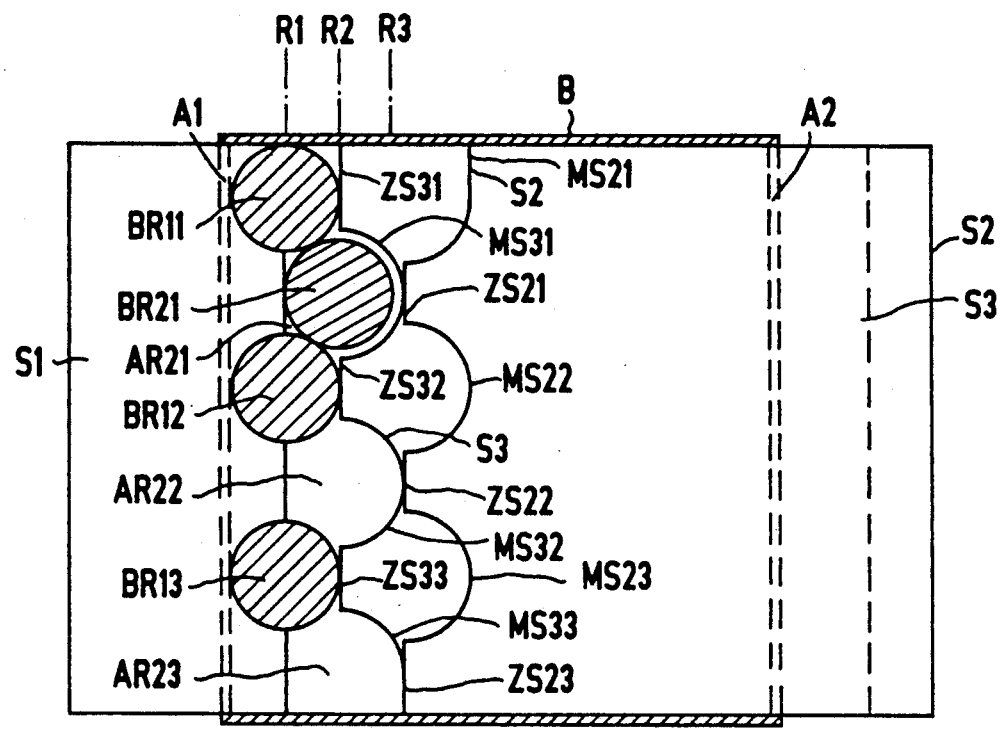
FIG. 5 is a view similar to FIG. 4 showing the filling apparatus during the introduction of a second row of rods.

After the complete filling of all of the rods BR11, BR12, BR13 of the first row R1, the slide S3 is advanced slightly. It is now in the filling position. This is shown in FIG. 3. The support teeth ZS31, ZS32, ZS33 of the slide S3 then rest directly on the rods BR11, BR12, BR13 of the first row R1, and lock them in a slip-free manner in the positions specified by the depressions of the slide S1. Without the danger of slippage of these rods, the slide S2 can then be retracted in turn into the waiting position, in which the depressions MS31, MS32, MS33 are uncovered by the slide S3. The rods of the second row R2 can then be introduced into the openings AR21, AR22, AR23 thus formed. In FIG. 5, the rod BR21 has already been introduced into the opening AR21. Since the rod position for the first row of rods is specified by the depressions of the slide S1, and because of the correspondingly offset configuration of the depressions at the end surface of the slides S2 and S3, an ordered, complete filling of the container B with rods in a close-packed hexagonal structure is possible in this way according to the invention.

Figure 6:
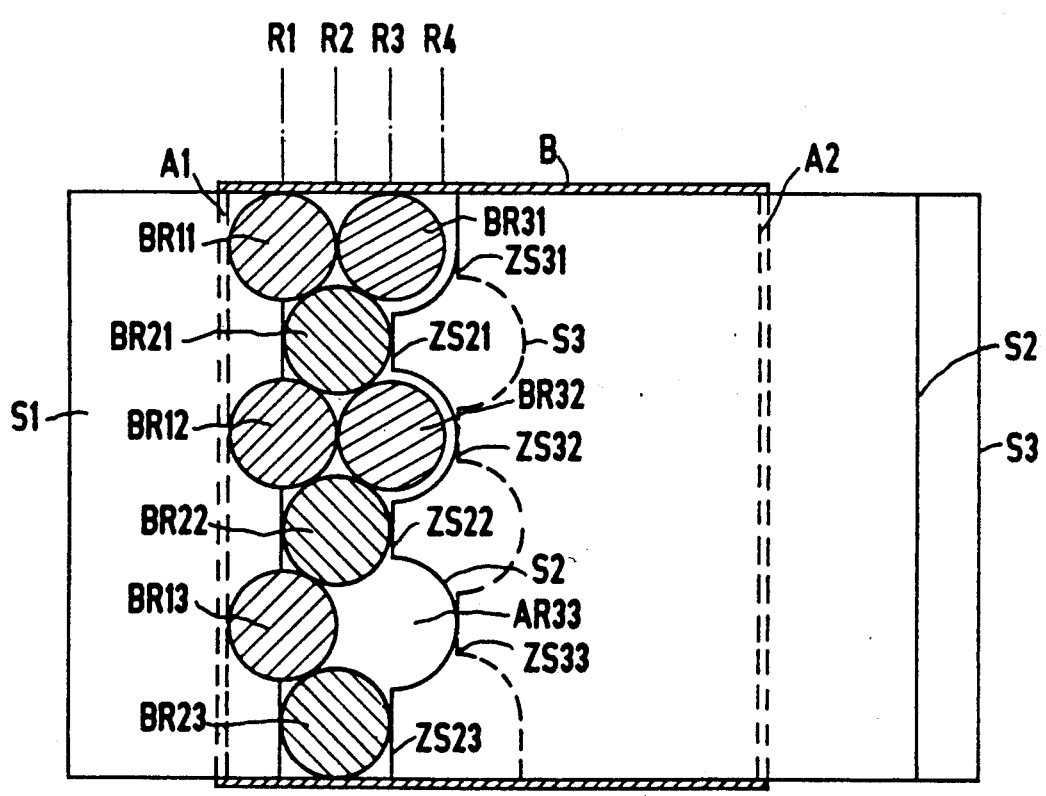
FIG. 6 is another view similar to FIG. 4 showing the filling apparatus during the introduction of a third row of rods.

In FIG. 6, the position of the slides necessary for introducing a third row R3 of rods is shown as an example. The slide S2 is shown in the filling position once again. Because the support teeth ZS21, ZS22, ZS23 rest directly on the most recently introduced rods BR21, BR22, BR23 of the second row R2, these rods are secured against displacement in such a way that the slide S3 can be retracted into the waiting position shown in FIG. 6. As a result, the depressions MS21, MS22, MS23 are uncovered. The rods of third row can then be introduced into the openings thus formed. As shown in FIG. 6, the rods BR31 and BR32 have already been introduced, while the opening AR33 has not yet been filled. With the aid of the slide just then located in the filling position, compacting of the already-introduced rows of rods by pressing against them is also possible.

Finally, FIG. 7 shows a filling apparatus completely filled with rods in a close-packed hexagonal structure, according to the invention. The associated container B is, for example, constructed in such a way that with complete ordered filling, nine rows R1 through R9, each having three rods per row, can be received offset from one another in a close-packed hexagonal structure. In order to provide sufficient play for the rods to be introduced in the filling operation and to avoid blockage, it is advantageous for the semicircular depressions of the slides S2 and S3 to have an inside radius R which is slightly greater than the radius r of a rod. In contrast, with the slide S1, it is advantageous for the depression radius to be equal to the radius r of the rods, because the exact position of the first row of rods and thus of all of the rods in the hexagonal packing structure are specified by means of these depressions.

Figure 2:
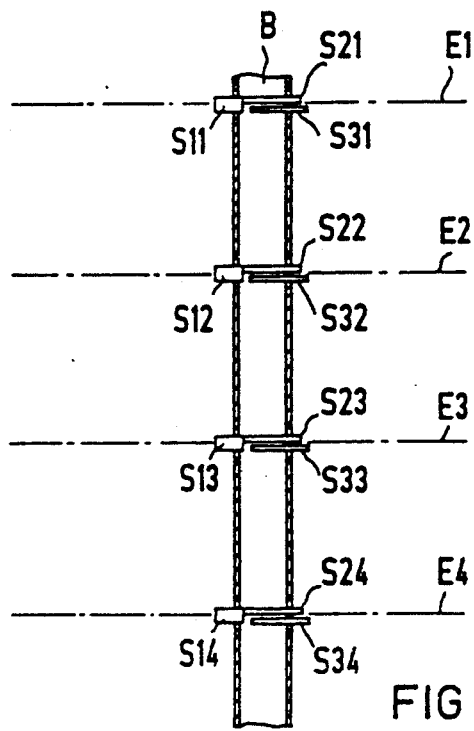
FIG. 2 is a fragmentary longitudinal-sectional view of another embodiment of the filling apparatus on a reduced scale.

In FIG. 2, a further advantageous exemplary embodiment of the filling apparatus according to the invention is shown, which can be used especially for rods of particularly great length. In FIG. 2, for instance, four sets of slides which are provided in four planes E1–E4 for the ordered filling of the container B, are each formed of three individual slides S11, S21, S31 through S14, S24, S34. Each of these slide sets has the structure described above. If the slides S11–S14, S21–S24 and S31–S34 which correspond to one another execute the same motions simultaneously and in parallel to one another, then very long rods can be introduced into the container B in ordered fashion in a close-packed hexagonal structure in a particularly advantageous manner without bending.

In FIG. 8, a further advantageous exemplary embodiment of the filling apparatus is shown. In this case instead of the slide S1, a metal sheet Z provided with depressions M1, M2 and M3 serves as the positioning means for specifying the positions of the first row of rods BR11, BR12, BR13. This embodiment has the particular advantage of not requiring a drive mechanism for moving the corrugated metal sheet Z or an opening in the container wall at the corresponding side. It is accordingly seen that the elements Z or S1 need merely be positioning means for the first row, while elements S2 and S3 are slides for the other rows.

Finally, a further advantageous embodiment of the filling apparatus is shown in FIGS. 9a, 9b and 9c. The depressions of the slides S1, S2 and S3 are not circular but rather trapezoidal in shape. Once again, it is advantageous for the inside radius R of the depressions to be slightly greater than the radius r of a rod.

What is claimed is:

1. Filling apparatus for the ordered, complete filing of a container with rods in a hexagonally close-packed structure, comprising:
   a) means for orderly positioning a first row of rods at predetermined positions in a container having an opening formed in a side thereof opposite said positioning means and an interior with a given width;
   b) two slides disposed one above the other for reaching through the opening over the entire given width of the interior of the container;
      b1) each of said slides having depressions formed therein defining support teeth between said depressions, said depressions defining openings at predetermined positions for receiving rods of a row, said depressions in one of said slides being offset relative to said depressions in the other of said slides, and said support teeth in one of said slides covering said openings in the other of said slides when said slides are superimposed;
      b2) said support teeth of one of said slides bracing the rods of a row disposed in said predetermined positions of the other of said slides after the introduction of a row of rods, and said predetermined positions of said one slide being uncovered for the introduction of a further row of rods into said predetermined positions of said one slide by retraction of said other slide; and
   c) said positioning means being in the form of a further slide for reaching through another opening over the entire given width of the interior of the container, said further slide having depressions formed therein defining openings at predetermined positions for receiving rods of a first row.

2. In combination with a container having an interior with a given width and a side wall with an opening formed therein, a filling apparatus for the ordered, complete filling of said container with rods in a hexagonally close-packed structure, said filling apparatus comprising:
   a) means disposed opposite said opening in said container for orderly positioning a first row of rods at predetermined positions in said container;
   b) two slides disposed one above the other for reaching through said opening over said entire given width of said interior of said container;
      b1) each of said slides having depressions formed therein defining support teeth between said depressions, said depressions defining openings at predetermined positions for receiving rods of a row, said depressions in one of said slides being offset relative to said depressions in the other of said slides, and said support teeth in one of said slides covering said openings in the other of said slides when said slides are superimposed;
      b2) said support teeth of one of said slides bracing the rods of a row disposed in said predetermined positions of the other of said slides after the introduction of a row of rods, and said predetermined positions of said one slide being uncovered for the introduction of a further row of rods into said predetermined positions of said one slide by retraction of said other slide; and
   c) said positioning means being in the form of a further slide for reaching through another opening over the entire given width of the interior of the container, said further slide halving depressions formed therein defining openings at predetermined positions for receiving rods of a first row.

3. Filling apparatus for the ordered, complete filling of a container with spent nuclear fuel rods in a hexagonally close-packed structure, comprising:
   a) means for orderly positioning a first row of fuel rods at predetermined positions in a container having an opening formed in a side thereof opposite said positioning means and an interior with a given width;
   b) two slides disposed one above the other for reaching through the opening over the entire given width of the interior of the container;
      b1) each of said slides having depressions formed therein defining support teeth between said depressions, said depressions defining openings at predetermined positions for receiving fuel rods of a row, said depressions in one of said slides being offset relative to said depressions in the other of said slides, and said support teeth in one of said slides covering said openings in the other of said slides when said slides are superimposed;
      b2) said support teeth of one of said slides bracing the fuel rods of a row disposed in said predetermined positions of the other of said slides after the introduction of a row of fuel rods, and said predetermined positions of said one slide being uncovered for the introduction of a further row of fuel rods into said predetermined positions of said one slide by retraction of said other slide; and
   c) said positioning means being in the form of a further slide for reaching through another opening over the entire given width of the interior of the container, said further slide having depressions formed therein defining openings at predetermined positions for receiving rods of a first row.

* * * * *